(12) United States Patent
Rotstein et al.

(10) Patent No.: US 7,046,617 B2
(45) Date of Patent: May 16, 2006

(54) METHOD AND APPARATUS FOR AN ENHANCED OFDM SYSTEM

(75) Inventors: Ron Rotstein, Arlington Heights, IL (US); Robert J. Corke, Glen Ellyn, IL (US); Arie Z. Schwartzman, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 14 days.

(21) Appl. No.: 10/806,308

(22) Filed: Mar. 22, 2004

(65) Prior Publication Data

US 2005/0207333 A1    Sep. 22, 2005

(51) Int. Cl.
*H04J 11/00* (2006.01)

(52) U.S. Cl. ...................................... 370/203
(58) Field of Classification Search .............. 370/203, 370/204, 205, 206, 208, 211, 319, 324, 343, 370/344, 480, 351, 352; 375/132, 245, 261, 375/298
See application file for complete search history.

(56) References Cited

U.S. PATENT DOCUMENTS 5,689,502 A * 11/1997 Scott ........................ 370/281
5,933,421 A * 8/1999 Alamouti et al. ............ 370/330
6,169,723 B1 * 1/2001 Fertner et al. .............. 370/210
6,449,303 B1 * 9/2002 Hunton ....................... 375/130

* cited by examiner

*Primary Examiner*—Dang Ton
(74) *Attorney, Agent, or Firm*—Indira Saladi

(57) ABSTRACT

A method and apparatus for communicating in an OFDM system whereby data subcarriers associated with a first antenna of at least two transmit antennas are multiplexed with data symbols while modulating other subcarriers associated with other antennas with zero. The data subcarriers are separated between the at least two transmit antennas so that a data subcarrier and a mirror data subcarrier are not transmitted from a same transmit antenna and that adjacent data subcarriers are at least two subcarrier frequency bandwidths apart. In an embodiment, the method and apparatus further comprise receiving the transmitted subcarriers from at least two receive antennas where the transmitted data subcarriers are also separated so that the data subcarrier and the mirror data subcarrier are not received from a same receive antenna of the at least two receive antennas. The method and apparatus further comprises combining the received transmitted subcarriers from the at least two receive antennas into a single data stream.

17 Claims, 2 Drawing Sheets

AN ENHANCED OFDM TRANSMITTER

AN ENHANCED OFDM TRANSMITTER

AN ENHANCED OFDM RECEIVER

ERROR DUE TO I/Q MISMATCH

METHOD AND APPARATUS FOR AN ENHANCED OFDM SYSTEM

FIELD OF THE INVENTION

The present invention relates generally to communication systems and in particular, to the field of orthogonal frequency division multiplexing (OFDM).

BACKGROUND OF THE INVENTION

OFDM has become widely accepted as a modulation mechanism and was adopted for the IEEE 802.11a modulation standard. However, there are a number of known drawbacks to OFDM. One disadvantage is that a conventional OFDM system exhibits performance degradation due to frequency coherence of the channel. For example, two adjacent subcarriers (also known as signals or frequencies), $f_1$ and $f_2$, experience correlated fading if $f_2-f_1 < B_c$, where $B_c$ is a frequency coherence bandwidth. The closer the spacing between the adjacent subcarriers, the narrower the required coherence bandwidth is. In many channels, adjacent subcarriers will fall within the coherence bandwidth and will thereby experience flat fading. Prior art solutions have attempted to mitigate this effect by utilizing inter-subcarrier interleaving; however such efforts are ineffective if many adjacent subcarriers are within the coherence bandwidth.

A second known drawback is that a conventional OFDM system exhibits performance degradation due to I/Q mismatch in the digital to analog and the analog to digital conversion. Specifically, analog processing performed by amplifiers, RF mixers, and other RF hardware contributes to the performance degradation. This degradation becomes significant at higher modulation modes such as 16 QAM and 64 QAM. For example, a transmitted signal at subcarrier m will experience interference in the form of cross talk from a mirror subcarrier −m.

A third known drawback with a conventional OFDM system is that it inherently exhibits a large peak to average power ratio (PAPR). The PAPR of an OFDM system is given by 10 log (N) where N is the number of subcarriers. For example for a 48 subcarrier system, such as 802.11a where 48 out of 64 subcarriers are active, the PAPR is approximately 17 dB. To mitigate the effect of such large PAPRs on performance degradation of the OFDM system, the design of the OFDM system needs to incorporate costly RF hardware, such as efficient and large linear dynamic range power amplifiers. Incorporating costly RF hardware, however, increases the cost of the OFDM system.

While the existing method and apparatus for an OFDM system is relatively satisfactory, there are a number of known disadvantages. Performance degradation due to frequency coherence, I/Q mismatch, and large PAPRs are a few of the known disadvantages. Accordingly, a need exists for a method and apparatus for an enhanced OFDM system.

BRIEF DESCRIPTION OF THE FIGURES

A preferred embodiment of the invention is now described, by way of example only, with reference to the accompanying figures in which.

Figure 1:
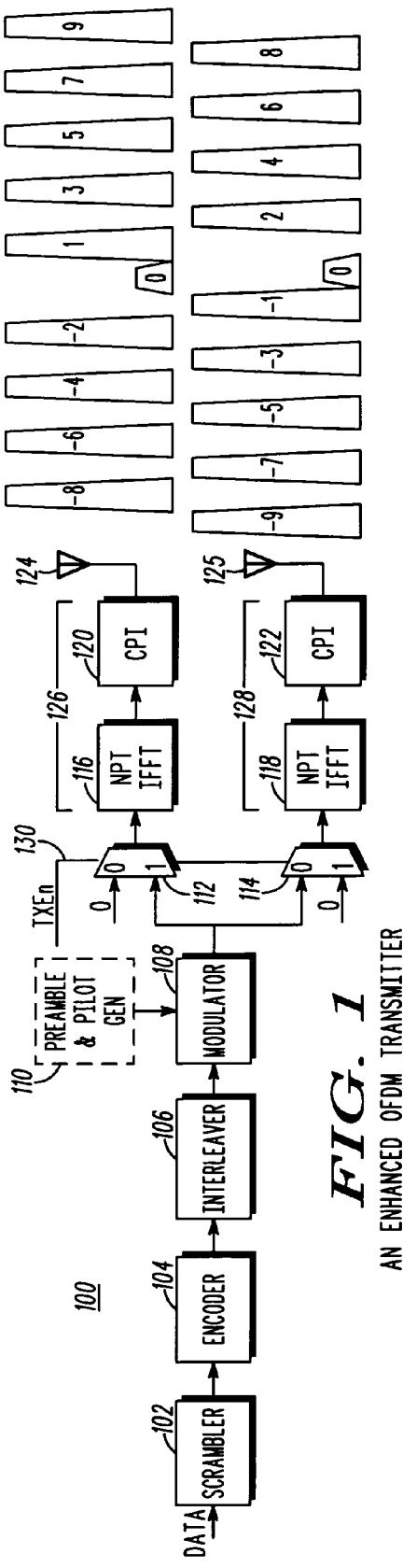
FIG. 1 is a block diagram illustrating components of a preferred embodiment of a transmitter device in accordance with the invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION OF THE PREFERRED EMBODIMENT

Referring now to FIG. 1, there is shown an example of the method and apparatus of the present invention as it may be employed and incorporated into an OFDM transmitter 100. The illustrated example functions to perform transmission of signals by using multiple subcarriers where each subcarrier is a multiple frequency of the base subcarrier. In the example of FIG. 1, the OFDM system has two transmit antennas 124, 125 and two transmit paths 126, 128. Transmission occurs by separating the subcarriers so that adjacent subcarriers are transmitted on separate transmit antennas 124, 125. That is, half the subcarriers (the first subset) are transmitted on one transmit antenna 124 and half the subcarriers (the second subset) are transmitted on a second transmit antenna 125. It is well known that sufficiently separating the two transmit antennas 124, 125 decorrelates the propagation of the first and second subcarrier subsets. In an embodiment of the present invention, sufficiently separating the two transmit antennas 124, 125 means to separate the two transmit antennas 124, 125 by 9λ, where λ is the carrier wavelength. By separating the two transmit antennas 124, 125, even if one or more of the subcarriers from the first subset is faded or is otherwise lost, the subcarriers from the second subset may still be received by a receiver of the OFDM system. By separating the transmission of adjacent subcarriers between the two transmit antennas 124, 125, the probability of adjacent subcarriers experiencing a simultaneous fade is reduced. Since the probability of adjacent subcarriers being simultaneously faded is reduced, the probability of losing long sequences of data is also reduced.

In an alternative embodiment of the invention, the OFDM transmitter 100 may comprise multiple transmit antennas and multiple transmit paths. Although the transmitter 100 has been described with reference to only two transmit antennas 124, 125 and only two transmit paths 126,128, the invention is contemplated to work with more than two transmit antennas and more than two transmit paths. For example, in an alternative embodiment, the transmitter 100 may comprise three or four transmit antennas and a corresponding number of transmit paths.

Specifically, in an exemplary embodiment of the present invention, the transmitter 100 functions as follows. Data is sent to a scrambler 102 where the data is randomized. Coding is applied to the randomized data by an encoder 104. The encoded data is then interleaved by an interleaver 106. The modulator 108 maps the interleaved data to modulation symbols according to a modulation scheme used by the OFDM transmitter 100. For example, known modulation schemes include binary phase shift keying (BPSK), quadrature phase shift keying (QPSK), sixteen symbol quadrature amplitude modulation (16 QAM) and sixty four symbol QAM (64 QAM).

In an alternative embodiment, preamble and pilot bits are added to the modulation symbols by a preamble and pilot generator 110 before the symbol stream is demultiplexed into two different transmit paths 126, 128. As is known to one skilled in the art, the use of a preamble and pilot generator 110 is optional and not necessary to an exemplary embodiment of the invention.

Next, the modulation symbols output from the modulator 108 are demultiplexed into two symbol streams where each symbol stream is processed by a different transmit path 126, 128. In essence, the modulation symbols output from the modulator 108 are upsampled by a factor of two via zero insertion between modulation symbols. Specifically, the signal TX En 130 at multiplexers 112, 114 toggles at a symbol rate, where the symbol rate is the rate at which the symbols are output from the modulator 108, so that the modulation symbols output from the modulator 108 are input to either N-point Inverse Fast Fourier Transform (IFFT) 116 or N-point IFFT 118. When modulation symbols are input to N-point IFFT 116, a zero is input to the N-point IFFT 118 and vice versa. Zeros are inserted for subcarriers not assigned to either transmit antennas 124, 125 so as to keep the OFDM symbol rate unchanged. The N-point IFFTs 116, 118 generate a time domain sample sequence which is further processed by CPIs 120, 122. CPIs 120, 122 prepend a cyclic prefix to the time domain sample sequence and the resulting sequence is converted from parallel to serial signals to be transmitted on transmit antennas 124, 125.

Figure 2:
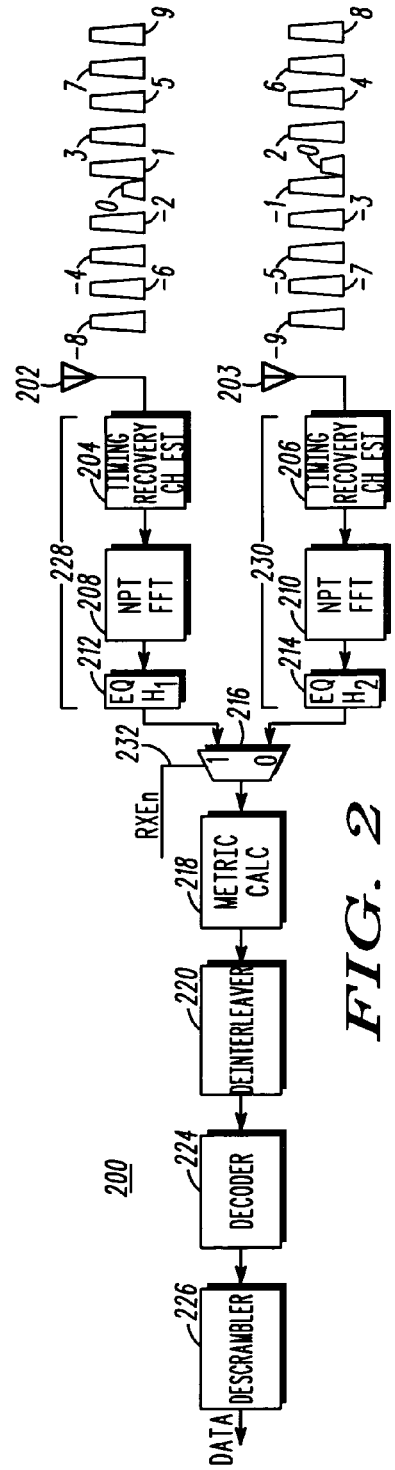
FIG. 2 is a block diagram illustrating components of a preferred embodiment of a receiver device in accordance with the invention.

Based upon this processing, the signals to be transmitted on transmit antennas 124, 125 have been separated in a specific manner. The spectral picture in FIG. 2 illustrates the separation of these signals. Looking at the spectral picture in FIG. 2, it is noted that the signals transmitted at each transmit antenna 124, 125 are assigned as follows:

| | |
|---|---|
| Signals at Transmit Antenna 124: | $-K, \ldots, -6, -4, -2, 0, 1, 3, 5, \ldots K - 1$; where K is an even integer |
| Signals at Transmit Antenna 125: | $-K - 1, \ldots, -5, -3 -1, 0, 2, 4, 6, \ldots, K$; where K is an even integer |

In one embodiment, the subcarriers that are transmitted on transmit antenna 124 are separated from the subcarriers that are transmitted on transmit antenna 125 such that mirror frequencies are not emitted from the same antenna. For example, the subcarriers that are transmitted at transmit antenna 124 are represented by negative, even numbers and positive, odd numbers, whereas the subcarriers that are transmitted at transmit antenna 125 are mirror frequencies represented by negative, odd numbers and positive, even numbers. For example, subcarriers 1 and 3 are transmitted from transmit antenna 124 and their mirror subcarriers −1 and −3 is transmitted from transmit antenna 125. As used herein, the term mirror refers to an indexed subcarrier and its negatively indexed subcarrier.

There are at least three advantages to transmitting signals in such a fashion. First, by separating the frequencies to be sent between the two transmit antennas 124, 125 the desired spatial diversity is achieved. As is known in the art, spatial diversity means that signals from two antennas are uncorrelated by virtue of the antenna spacing. For example in FIG. 1, subcarrier 1 and other subcarriers being transmitted on transmit antenna 124 are uncorrelated to subcarrier −1 and the other subcarriers being transmitted on transmit antenna 125. By uncorrelating the signals being sent on transmit antenna 124 from the signals being sent on transmit antenna 125, the performance of the OFDM is enhanced since the signals being sent on transmit antenna 125 and the signals being sent on transmit antenna 124 experience uncorrelated fading.

Second, allocating the subcarriers on the same antenna by two subcarrier frequency bandwidths further decorrelates the channel. For example, subcarrier −1 is two subcarrier frequency bandwidths from subcarrier −3 on transmit antenna 125. As is known in the art, separating subcarriers on the same antenna is termed frequency diversity. Frequency diversity decorrelates subcarriers which are separated by the coherence bandwidth of the channel. In a preferred embodiment and for the IEEE 802.11a standard, each subcarrier channel is approximately 300 kHz wide and thus adjacent subcarriers on a single antenna will be 300 kHz apart. By doubling the distance between adjacent subcarriers on a single antenna, the maximum coherence bandwidth, $B_c$, required for frequency diversity is doubled. Alternate embodiments may be chosen whereby the distance between adjacent subcarriers is dependent upon the system protocol and the modulation scheme implemented. For example, in an alternate embodiment where the transmitter has four transmit antennas, the distance between adjacent subcarriers on a single transmit antenna will be quadrupled. Thus, in such an embodiment, the maximum allowable coherence bandwidth for frequency diversity is also quadrupled.

Third, by separating adjacent subcarriers and transmitting zeroes between adjacent subcarriers on the same transmit antenna, the peak to average power ratio (PAPR) is improved. In the embodiment of FIG. 1, where there are two transmit antennas and the number of subcarriers on a single transmit antenna is halved, the peak to average power ratio is reduced by half (½). In an alternative embodiment where there are three transmit paths and three transmit antennas, the peak to average power ratio is reduced by one third (⅓). In yet another embodiment, the peak to average power ratio is reduced by 1/K where (K) is the number of antennas. Reducing the PAPR improves transmitter 100 performance because reducing the PAPR reduces the likelihood of signal distortion at the output of the transmitter at transmit antennas 124, 125

In one embodiment of an enhanced OFDM system, the transmitter 100 is modified so as to have two transmit antennas 124, 125 and two transmit paths 126, 128 while a receiver of the system is a typical receiver (not shown). The subcarrier subsets at the typical receiver are decorrelated and the typical receiver is unaware that the transmitter 100 has been modified to have two transmit antennas 124, 125 and two transmit paths 126, 128, as described above. According to such an embodiment of the invention, any conventional receiver as currently being used in an OFDM system will work with the transmitter 100 of FIG. 1. As used herein, a typical or conventional receiver means that the receiver has only one receive path and only one receive antenna. Specifically, the transmitter 100 of FIG. 1 is designed to work independently of the type of receiver used. Thus, the transmitter 100 of FIG. 1 is backwards compatible with existing systems.

The ability of the transmitter 100 to work with a typical or conventional receiver and maintain backward compatibility can be explained as a result of two features inherent in OFDM systems. The first feature is linearity. Signals received at a receiver (typical, receiver 200, or otherwise) are processed by a Fast Fourier Transformer (FFT) which is a linear transformation. That is, the FFT of the weighted summation of two (time domain) sequences is the summa tion of the FFTs of the individual sequences. Mathematically, linearity is described as follows:

$$FFT(x_1+x_2)=FFT(x_1)+FFT(x_2)$$

So, if the transmitter 100 decomposes the (frequency domain) mapped symbol set X, into two subsets $X_1$ and $X_2$, and transmits the corresponding (time domain) sequences, $x_1=IFFT[X_1]$ and $x_2=IFFT[X_2]$, the receiver will form the FFT of the summation to yield $$X_1+X_2=X$$

which is the original mapped symbol set. Thus, because of the linearity of a FFT, the receiver is able to process two subsets or a single set and, therefore, the transmitter 100 is able to work with a typical or conventional receiver.

The second feature relates to the cyclic prefix. As mentioned above, before a signal is transmitted from transmitter 100, a cyclic prefix is prepended to the time domain sample sequence. The signal with the cyclic prefix is transmitted from the transmitter 100 and received at a receiver (typical, receiver 200, or otherwise). When the delay of the received signal is less than the cyclic prefix length (a condition required for existing "single transmit antenna" OFDM systems), the effects of the delay are compensated for by an equalizer, present in all conventional OFDM receivers. Thus, because of the cyclic prefix, the receiver is able to process two subsets or a single set and, therefore, the transmitter 100 is able to work with a typical or conventional receiver.

Referring now to FIG. 2, there is shown an example of the method and apparatus of the present invention as it may be employed and incorporated into an OFDM receiver 200. In the example of FIG. 2, the receiver 200 comprises two receive antennas 202, 203 and two receive paths 228, 230. In an alternative embodiment of the invention, the OFDM receiver 200 may comprise multiple receive antennas and multiple receive paths. Although the receiver 200 has been described with reference to only two receive antennas 202, 203 and only two receive paths 228, 230, the invention is contemplated to work with more than two receive antennas and more than two receive paths. For example, in an alternative embodiment, the receiver 200 may comprise three or four receive antennas and a corresponding number of receive paths.

Specifically, in an exemplary embodiment of the present invention, the receiver 200 functions as follows. Signals transmitted by a transmitter 100 are received at a receiver 200 by receive antennas 202, 203. Based upon the processing at the transmitter, transmitted signals are received at the receiver in a specific manner. The spectral picture in FIG. 2 illustrates the separation of these signals. Looking at the spectral picture in FIG. 2, it is noted that the signals received at each receive antenna 202, 203 are as follows:

| | |
|---|---|
| Signals at Receive Antenna 202: | −K, . . . , −6, −4, −2, 0, 1, 3, 5, . . . K − 1; where K is an even integer |
| Signals at Receive Antenna 203: | −K − 1, . . . , −5, −3 −1, 0, 2, 4, 6, . . . , K; where K is an even integer |

In one embodiment, the subcarriers that are received at receive antenna 202 are separated from the subcarriers that are received at receive antenna 203 such that mirror frequencies are not received from the same receive antenna. For example, the subcarriers that are received at receive antenna 202 are represented by negative, even numbers and positive, odd numbers, whereas the subcarriers that are received at receive antenna 203 are mirror frequencies represented by negative, odd numbers and positive, even numbers. For example, subcarriers 1 and 3 are received from receive antenna 202 and their mirror subcarriers −1 and −3 is received from receive antenna 203.

Once the signals or subcarriers are received at receive antennas 202, 203, front end processing of received subcarriers is performed by timing recovery and channel estimate blocks 204, 206. Timing recovery and channel estimate blocks 204, 206 correlate the received subcarriers with a reference sequence and determine the received sequences. Then, the received sequences are processed by Fast Fourier Transform (FFT) blocks 208, 210 where the received sequences are converted from time domain to complex frequency domain symbol streams. Then, the complex frequency domain symbol streams are processed by equalizer blocks 212, 214 where the symbol streams are compensated for channel effects. The two symbol streams from the two receive paths 228, 230 are demultiplexed into one data stream by demultiplexer 216. The signal RX En 232 toggles between selecting receive path 228 and receive path 230 where in the process of demultiplexing the two symbol streams, the zeroes inserted by the transmitter 100 are removed. By removing the zeros inserted by the transmitter 100, the subcarriers received from receive antenna 202 and the subcarriers received from receive antenna 203 are placed one subcarrier frequency bandwidth apart. Thus, at the output of the demultiplexer 216, subcarriers are placed in sequential order. For example, the subcarriers at the output of the demultiplexer 216 can be described as −N, . . . , −3, −2, −1, 0, 1, 2, 3, . . . N, where N is an integer.

Processing continues by a metric calc 218 which calculates bit metrics on the received data stream for input to a deinterleaver 220. The bit metrics are then deinterleaved by deinterleaver 220. The deinterleaved bit metrics are processed by a decoder 224 where a decoding scheme is applied to the deinterleaved data. The decoded data is processed by a descrambler 226 where the decoded data is unrandomized and data is retrieved.

There are at least two advantages to receiving signals in this fashion. First, spatial diversity between the subcarrier subsets (one subset for TX antenna 124 and one subset from TX antenna 125) is achieved by using multiple receive antennas. In an alternative embodiment, where additional processing such as multiple signal detection and combining occurs, diversity among the same subcarrier subset may be realized. That is, by detecting the signal from a single transmit antenna at a single receiver antenna, the sample streams at each receive antenna of the receiver 200 from a given transmit antenna of the transmitter 100 can be optimally combined. The combined streams from each transmit antenna 124, 125 are then multiplexed among the separate receive antennas as described above. For example, the signal received at antenna 1 can be decomposed into the signals from transmit antenna 1, $x_{11}$, and transmit antenna 2, $x_{21}$. Likewise, the signal received at antenna 2 can be decomposed into the signals from transmit antenna 1, $x_{12}$, and transmit antenna 2, $x_{22}$. The components from each transmit antenna can then be optimally combined to yield the two transmitted signal $x_1=x_{11}+x_{12}$ and $x_2=x_{21}+x_{22}$. By doing this, system performance of the OFDM system is improved.

Second, by separating subcarriers and their mirror frequencies, there is performance improvement due to eliminating the typical I/Q mismatch inherent in an OFDM system. Since the component of the mirror subcarrier present in the demodulation of a given subcarrier is interference with respect to the desired subcarrier, eliminating I/Q mismatch reduces the interference levels. Therefore, system performance of the OFDM system is improved.

In a typical receiver system (not shown), where there is only one receive antenna and only one receive path for the received signal, the received signal is corrupted by leakage from one subcarrier into the subcarrier's mirror frequency. For example, looking at FIG. 2, shown is a corrupted signal at subcarrier 1 and at subcarrier −1. Specifically, shown is leakage from subcarrier 1 into the signal at subcarrier −1, and vice versa, whereby leakage means the introduction of noise into the subcarrier at 1 by the subcarrier at −1, and vice versa. Mathematically, this type of signal corruption can be explained as follows.

A typical transmitted baseband signal as received in a typical receiver system (not shown) is described as $$x_{bb}(t) = \frac{1}{N} \sum_{k=-K/2}^{K/2} X_k e^{j2\pi f_k t} = i + jq \quad (1)$$

where $X_k$ is the complex modulation symbol for the $k^{th}$ subcarrier. Further, the transmitted signal is $$s(t) = \text{Re}[x_{bb}(t) e^{j2\pi f_c t}] \quad (2)$$
$$= i \cos(2\pi f_c t) - q \sin(2\pi f_c t)$$

Assuming a noise free channel, no frequency offset, perfect sample timing and an I/Q amplitude and phase imbalance of $\alpha$ and $$\frac{\theta}{2},$$

respectively, the receiver demodulator output is $$\hat{x}_{bb}(t) = \hat{i} + j\hat{q},$$

with $$\hat{i}(t) = \frac{1}{2}\left[(1+\alpha)\left(i \cos\left(\frac{\theta}{2}\right) + q \sin\left(\frac{\theta}{2}\right)\right)\right] \quad (3)$$
$$= \frac{1}{2}(1+\alpha)\text{Re}\left[x_{bb}(t) e^{j\frac{\theta}{2}}\right]$$
$$\hat{q}(t) = \frac{1}{2}\left[(1-\alpha)\left(q \cos\left(\frac{\theta}{2}\right) - i \sin\left(\frac{\theta}{2}\right)\right)\right]$$
$$= \frac{1}{2}(1-\alpha)\text{Im}\left[x_{bb}(t) e^{-j\frac{\theta}{2}}\right]$$

So $$\hat{x}_{bb}(t) = \left(\cos\left(\frac{\theta}{2}\right) + j\alpha \sin\left(\frac{\theta}{2}\right)\right) x_{bb}(t) + \left(\alpha \cos\left(\frac{\theta}{2}\right) - j \sin\left(\frac{\theta}{2}\right)\right) x_{bb}^*(t) \quad (4)$$

Substituting Equation (1) for $x_{bb}(t)$ and sampling at $t=nT_s=1/(Nf_o)$, where $f_0$ is the subcarrier spacing such that $f_k = k f_o$ yields $$\hat{x}_{bb}(n) = \left(\cos\left(\frac{\theta}{2}\right) + j\alpha \sin\left(\frac{\theta}{2}\right)\right) \frac{1}{N} \sum_{k=-K/2}^{K/2} X_k e^{j2\pi \frac{nk}{N}} +$$
$$\left(\alpha \cos\left(\frac{\theta}{2}\right) - j \sin\left(\frac{\theta}{2}\right)\right) \frac{1}{N} \sum_{k=-K/2}^{K/2} X_k^* e^{-j2\pi \frac{nk}{N}}$$
$$= \frac{1}{N}\left\{\cos\left(\frac{\theta}{2}\right)\left(\sum_{k=-K/2}^{K/2} X_k e^{j2\pi \frac{nk}{N}} + \sum_{k=-K/2}^{K/2} \alpha X_k^* e^{-j2\pi \frac{nk}{N}}\right) +\right.$$
$$\left.j \sin\left(\frac{\theta}{2}\right)\left(\sum_{k=-K/2}^{K/2} \alpha X_k e^{j2\pi \frac{nk}{N}} - \sum_{k=-K/2}^{K/2} X_k^* e^{-j2\pi \frac{nk}{N}}\right)\right\}$$
$$= \frac{1}{N}\left\{\cos\left(\frac{\theta}{2}\right)\left(\sum_{k=-K/2}^{K/2} X_k e^{j2\pi \frac{nk}{N}} + \sum_{k=-K/2}^{K/2} \alpha X_{-k}^* e^{j2\pi \frac{nk}{N}}\right) +\right.$$
$$\left.j \sin\left(\frac{\theta}{2}\right)\left(\sum_{k=-K/2}^{K/2} \alpha X_k e^{j2\pi \frac{nk}{N}} - \sum_{k=-K/2}^{K/2} X_{-k}^* e^{j2\pi \frac{nk}{N}}\right)\right\}$$
$$= \frac{1}{N}\left\{\cos\left(\frac{\theta}{2}\right) \sum_{k=-K/2}^{K/2} (X_k + \alpha X_{-k}^*) +\right.$$
$$\left.j \sin\left(\frac{\theta}{2}\right) \sum_{k=-K/2}^{K/2} (\alpha X_k - X_{-k}^*)\right\} e^{j2\pi \frac{nk}{N}}$$

Taking the DFT of $x_{bb}(n)$, the $m^{th}$ subcarrier becomes $$\hat{X}_m = \cos\left(\frac{\theta}{2}\right)(X_m + \alpha X_{-m}^*) + j \sin\left(\frac{\theta}{2}\right)(\alpha X_m - X_{-m}^*) \quad (5)$$

If the $2^{nd}$ order terms are excluded, then the $m^{th}$ subcarrier is approximated as $$\hat{X}_m \approx \cos\left(\frac{\theta}{2}\right) X_m - j \sin\left(\frac{\theta}{2}\right) X_{-m}^* \quad (6)$$
$$= \cos\left(\frac{\theta}{2}\right)\left[X_m - j \tan\left(\frac{\theta}{2}\right) X_{-m}^*\right], \text{ where } X_m \text{ is the transmitted signal.}$$

From this approximation, it is seen that in the presence of I/Q mismatch, the $m^{th}$ subcarrier experiences interference in the form of noise, or cross talk, from the mirror subcarrier.

Figure 3:
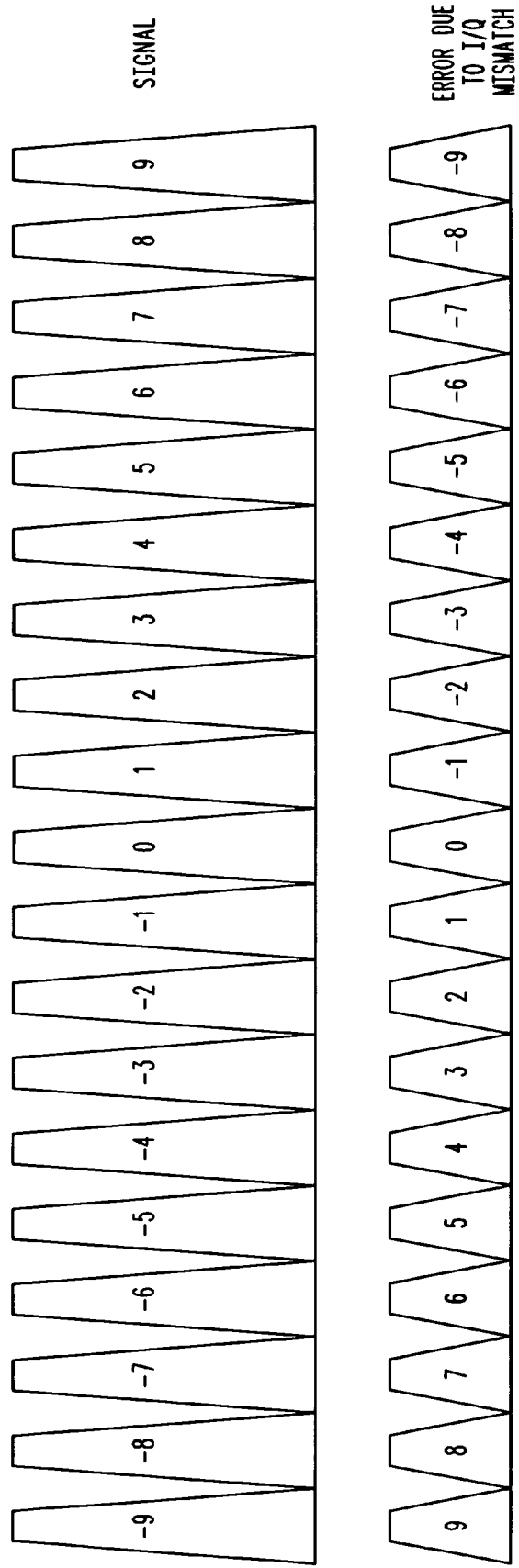
FIG. 3 is a spectral diagram illustrating error due to I/Q mismatch solved by an embodiment of the present invention.

Equation (6) describes what happens if there is a mismatch between I and Q. Illustrated in FIG. 3 is the quality of signals where is error due to I/Q mismatch. Shown is a signal N, and its mirror signal −N where the signal has been corrupted by I/Q mismatch. For example, in FIG. 3 there is illustrated a mismatch at I and Q at subcarrier 1. Since a subcarrier affects its mirror subcarrier, subcarrier 1 will corrupt subcarrier −1 and vice versa. Equation (6) shows that if there is a mismatch in I and Q, both subcarriers, the original and its mirror, are corrupted. Further, the magnitude of the corruption is described by the coefficient in Equation (6) as $$\cos\frac{\theta}{2} \tan\frac{\theta}{2} = \sin\frac{\theta}{2},$$

where θ is the angle of inaccuracy between I and Q.

In the embodiment of FIG. 2, if there is I/Q mismatch in the OFDM system, the design of the receiver 200 is impervious to the problem. The design of the receiver 200 is such that mirror subcarriers are not processed from the same antenna. When a mismatch occurs between I and Q, the corruption to the mirror subcarriers that occurs is symmetrical and since mirror subcarriers are received on separate antennas, the design of the receiver is impervious to the corruption. For example, if subcarrier 3 is received on antenna 202, the mirror subcarrier which is corrupted is also received on antenna 202. The receiver 200 design, however, is such that the demultiplexer 216 does not select the corrupted mirror subcarrier received from receive path 228. The demultiplixer 216 is reading the transmitted signal and ignoring the corrupted signal. Hence the enhanced OFDM system is impervious to the corrupted mirror subcarrier. The receiver selects subcarrier 3 on receive path 228 and ignores the corrupted the corrupted subcarrier –3 received on receive path 228. Similarly, the receiver selects subcarrier –3 on receive path 230 and ignores the corrupted subcarrier 3 received on receive path 230.

Note, that although additional hardware for two receive paths 228, 230 is required, the additional hardware required for an additional receiver processing is more than offset by the elimination of the hardware required for I/Q mismatch compensation. Typically additional hardware including calibration hardware, look-up tables for transcendental functions, multipliers, and adders are needed to compensate for the I/Q mismatch. Such hardware is unnecessary and eliminated from the receiver 200, While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. For example, the subscriber unit and/or the base radio may comprise a storage medium having stored thereon a set of instructions which, when loaded into a hardware device (e.g., a microprocessor), causes the hardware device to perform the following functions of the present invention. The present invention can be implemented in at least one of hardware, firmware and/or software. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

It should be noted that the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language).

I claim:

1. A method for communicating in an OFDM system comprising the steps of:
   multiplexing data subcarriers associated with a first antenna of at least two transmit antennas with data symbols while modulating other subcarriers associated with other antennas with zero, wherein the data subcarriers are separated between the at least two transmit antennas so that a data subcarrier and a mirror data subcarrier are not transmitted from a same transmit antenna of the at least two transmit antennas; and
   transmitting subcarriers, comprising the data subcarriers and the zero modulated subcarriers, so that adjacent data subcarriers are at least two subcarrier frequency bandwidths apart.

2. The method of communicating as in claim 1 wherein the step of transmitting further comprises toggling between the data subcarriers and the zero modulated subcarriers.

3. The method of communicating as in claim 1 further comprising the step of receiving the transmitted subcarriers by a receiver system comprising one receive antenna and one receive processing path.

4. The method of communicating as in claim 1 further comprising the step of
   receiving the transmitted subcarriers from at least two receive antennas wherein the transmitted data subcarriers arc separated between the at least two receive antennas so that the data subcarrier and the mirror data subcarrier are not received from a same receive antenna of the at least two receive antennas; and
   combining the received transmitted subcarriers from the at least two receive antennas into a single data stream.

5. The method of claim 1 wherein the subcarriers transmitted on a first transmit antenna of the at least two transmit antennas comprise negative, even subcarriers and positive, odd subcarriers.

6. A method for transmitting subcarriers in an OFDM system comprising the steps of:
   multiplexing the data subcarriers of the OFDM system between a first transmit antenna and a second transmit antenna wherein the data subcarriers are separated between the first transmit antenna and second transmit antenna so that a data subcarrier is transmitted on the first transmit antenna and a mirror data subcarrier is transmitted on the second transmit antenna; and
   toggling between the data subcarriers and zero modulated subcarriers so that data subcarriers transmitted on a same antenna of either the first transmit antenna or the second transmit antenna are separated from an adjacent data subcarrier transmitted on the same antenna by two subcarrier frequency bandwidths.

7. A method for receiving subcarriers in an OFDM system comprising the steps of:
   receiving the subcarriers of the OFDM system from a first receive antenna and a second receive antenna wherein the transmitted subcarriers are separated such that (i) a subcarrier is received on the first receive antenna and a mirror subcarrier is received on the second receive antenna, and (ii) adjacent subcarriers on a same antenna of the first antenna and the second antenna are separated by zero modulated subcarriers; and
   toggling between the subcarriers received on the first receive antenna and the second receive antenna to create a single data stream by removing the zero modulated subcarriers.

8. The method of claim 7 wherein the subcarriers received on the first receive antenna comprise negative, even subcarriers and positive, odd subcarriers.

9. A method for communicating in an OFDM system comprising the steps of:
   transmitting subcarriers, comprising data subcarriers and zero modulated subcarriers so that the data subcarriers are associated with a first antenna of at least two transmit antennas and the zero modulated subcarriers are associated with other antennas, wherein the data subcarriers are separated between the at least two transmit antennas so that a data subcarrier and a mirror data subcarrier are not transmitted from a same transmit antenna of the at least two transmit antennas; and receiving the subcarriers of the OFDM system by multiplexing the subcarriers between at least two receive antennas wherein the sub carriers are separated between the at least two receive antennas so that a data subcarrier and a mirror data subcarrier are not received from a same receive antenna of the at least two receive antennas to create a single data stream by removing the zero modulated subcarriers from the at least two receive antennas.

10. The method of claim 9 wherein the OFDM system exhibits a reduction in peak to average power ratio related to 1/N where N is equal to a number of transmit antennas of the at least two transmit antennas in the OFDM system.

11. An enhanced OFDM system comprising:

a transmit multiplexer which separates subcarriers of the OFDM system between at least two transmit antennas;

a switch providing a symbol rate so that adjacent subcarriers on a same antenna of the at least two transmit antennas are at least two subcarrier frequency bandwidths apart with zero modulated subcarriers between the adjacent subcarriers; and the at least two transmit antennas which transmit the subcarriers to a receiver of the OFDM system, wherein a subcarrier and a mirror subcarrier of the subcarriers are not associated with the same transmit antenna of the at least two transmit antennas.

12. The enhanced OFDM system of claim 11 wherein at least two transmit antennas are used comprising a first transmit antenna and a second antenna.

13. The enhanced OFDM system of claim 11 wherein the receiver comprises one receive antenna and one receive processing path.

14. The enhanced OFDM system of claim 11 further comprising a receiver multiplexer for selecting between a first receive antenna and a second receive antenna.

15. The enhanced OFDM system of claim 12 whereby corrupted mirror subcarriers are not selected by the receiver multiplexer of the enhanced OFDM system.

16. The enhanced OFDM system of claim 12 wherein the transmit multiplexer further comprises a processor for processing negative, even subcarriers and positive, odd subcarriers onto the first transmit antenna.

17. An enhanced OFDM system comprising:

means for multiplexing data subcarriers associated with a first antenna of at least two transmit antennas with data symbols while modulating other subcarriers associated with other antennas with zero, wherein the data subcarriers are separated between the at least two transmit antennas so that a data subcarrier and a mirror data subcarrier are not transmitted from a same transmit antenna of the at least two transmit antennas; and means for transmitting subcarriers, comprising the data subcarriers and zero modulated subcarriers, so that adjacent data subcarriers are at least two subcarrier frequency bandwidths apart.

* * * * *

UNITED STATES PATENT AND TRADEMARK OFFICE
CERTIFICATE OF CORRECTION

PATENT NO. : 7,046,617 B2
APPLICATION NO. : 10/806308
DATED : May 16, 2006
INVENTOR(S) : Rotstein et al.

It is certified that error appears in the above-identified patent and that said Letters Patent is hereby corrected as shown below:

Col. 10, line 28, change "the data" to --data--

Signed and Sealed this

Fifth Day of December, 2006

JON W. DUDAS
*Director of the United States Patent and Trademark Office*